US011874969B2

(12) United States Patent
Wang et al.

(10) Patent No.: US 11,874,969 B2
(45) Date of Patent: Jan. 16, 2024

(54) METHOD FOR DETERMINING TWO-HANDED GESTURE, HOST, AND COMPUTER READABLE MEDIUM

(71) Applicant: HTC Corporation, Taoyuan (TW)

(72) Inventors: Chun-Li Wang, Taoyuan (TW); Caesar Tan, Taoyuan (TW); Yi-Cheng Lai, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/683,360

(22) Filed: Mar. 1, 2022

(65) Prior Publication Data
US 2023/0078183 A1 Mar. 16, 2023

Related U.S. Application Data

(60) Provisional application No. 63/244,268, filed on Sep. 15, 2021.

(51) Int. Cl.
*G06V 20/20* (2022.01)
*G06F 3/01* (2006.01)
(Continued)

(52) U.S. Cl.
CPC .......... *G06F 3/017* (2013.01); *G02B 27/0101* (2013.01); *G02B 27/017* (2013.01);
(Continued)

(58) Field of Classification Search
CPC ..... G06F 3/017; G06F 3/011; G02B 27/0101; G02B 27/017; G02B 2027/0138;
(Continued)

(56) References Cited

U.S. PATENT DOCUMENTS 8,558,759 B1 * 10/2013 Prada Gomez ......... G06F 3/017
345/619
9,076,033 B1 * 7/2015 Barron .................... G06F 3/005
(Continued)

FOREIGN PATENT DOCUMENTS

| CN | 111831106 | 10/2020 |
|----|-----------|---------|
| CN | 113221729 | 8/2021 |
| TW | 202105129 | 2/2021 |

OTHER PUBLICATIONS

Kohei et al., Obstacle Avoidance Method in Real Space for Virtual Reality Immersion, published 2018, pp. 1-10 (Year: 2018).*
"Office Action of Taiwan Counterpart Application", dated Nov. 21, 2022, p. 1-p. 10.

*Primary Examiner* — Shahid K Khan
*Assistant Examiner* — Ahamed I Nazar
(74) *Attorney, Agent, or Firm* — JCIPRNET

(57) ABSTRACT

The disclosure provides a method for determining a two-handed gesture, a host, and a computer readable medium. The method includes: providing a visual content of a reality system; tracking a first hand gesture and a second hand gesture perform by two hands; in response to determining that the first hand gesture and the second hand gesture form a two-handed gesture, activating a system function of the reality system, wherein the system function of the reality system is independent to the visual content.

19 Claims, 7 Drawing Sheets

(51) Int. Cl.
  *G06V 40/20* (2022.01)
  *G02B 27/01* (2006.01)
  *G06T 1/00* (2006.01)
(52) U.S. Cl.
  CPC ............ *G06F 3/011* (2013.01); *G06T 1/0007* (2013.01); *G06V 20/20* (2022.01); *G06V 40/28* (2022.01); *G02B 2027/014* (2013.01); *G02B 2027/0138* (2013.01)
(58) Field of Classification Search
  CPC ............ G02B 2027/014; G06T 1/0007; G06V 20/20; G06V 40/28
  USPC ......................................................... 715/863
  See application file for complete search history.

(56) References Cited

U.S. PATENT DOCUMENTS

| | | | |
|---|---|---|---|
| 9,686,466 B1 * | 6/2017 | Billinghurst | H04N 23/635 |
| 2010/0199232 A1 * | 8/2010 | Mistry | G06F 3/0426 |
| | | | 715/863 |
| 2014/0240225 A1 * | 8/2014 | Eilat | G06F 3/011 |
| | | | 345/156 |
| 2015/0002540 A1 * | 1/2015 | De | G06T 19/006 |
| | | | 345/633 |
| 2016/0091975 A1 * | 3/2016 | Kumar | G06F 3/011 |
| | | | 345/8 |
| 2017/0113702 A1 * | 4/2017 | Thieberger-Navon | |
| | | | B60W 50/0097 |
| 2019/0025909 A1 * | 1/2019 | Mittal | G06F 3/011 |
| 2019/0227694 A1 * | 7/2019 | Shin | G06F 3/017 |
| 2020/0293108 A1 * | 9/2020 | Georgiou | G02B 27/0093 |

\* cited by examiner

METHOD FOR DETERMINING TWO-HANDED GESTURE, HOST, AND COMPUTER READABLE MEDIUM

CROSS-REFERENCE TO RELATED APPLICATION

This application claims the priority benefit of U.S. provisional application Ser. No. 63/244,268, filed on Sep. 15, 2021. The entirety of the above-mentioned patent application is hereby incorporated by reference herein and made a part of this specification.

BACKGROUND

1. Field of the Invention

The present disclosure generally relates to a gesture detection mechanism, in particular, to a method for determining a two-handed gesture, a host, and a computer readable medium.

2. Description of Related Art

In reality systems such as virtual reality (VR) systems and augmented reality (AR) systems, users are allowed to interact with the visual content (e.g., VR contents) provided by the reality systems via hand gestures.

Conventionally, the reality systems consider the hand gestures performed by the user's hands separately. That is, the reality systems can only respond to one hand gesture at a time instead of allowing the user to interact with the visual content with two-handed gestures.

SUMMARY OF THE INVENTION

Accordingly, the disclosure is directed to a method for determining a two-handed gesture, a host, and a computer readable medium, which may be used to solve the above technical problems.

The embodiments of the disclosure provide a method for determining a two-handed gesture, adapted to a host. The method includes: providing a visual content of a reality system; tracking a first hand gesture and a second hand gesture perform by two hands; in response to determining that the first hand gesture and the second hand gesture form a two-handed gesture, activating a system function of the reality system, wherein the system function of the reality system is independent to the visual content.

The embodiments of the disclosure provide a host including a storage circuit and a processor. The storage circuit stores a program code. The processor is coupled to the storage circuit and accesses the program code to perform: providing a visual content of a reality system; tracking a first hand gesture and a second hand gesture perform by two hands; in response to determining that the first hand gesture and the second hand gesture form a two-handed gesture, activating a system function of the reality system, wherein the system function of the reality system is independent to the visual content.

The embodiments of the disclosure provide a computer readable medium, the computer readable medium recording an executable computer program, the executable computer program being loaded by a host to perform steps of: providing a visual content of a reality system; tracking a first hand gesture and a second hand gesture perform by two hands; in response to determining that the first hand gesture and the second hand gesture form a two-handed gesture, activating a system function of the reality system, wherein the system function of the reality system is independent to the visual content.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the disclosure.

DESCRIPTION OF THE EMBODIMENTS

Figure 1:
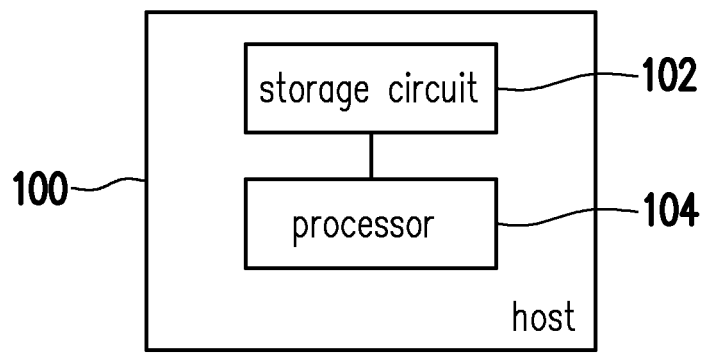
FIG. 1 shows a schematic diagram of a host according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

See FIG. 1, which shows a schematic diagram of a host according to an embodiment of the disclosure. In FIG. 1, the host 100 can be any device capable of tracking hand gestures of the user. In one embodiment, the host 100 can be a head-mounted display (HMD) that provides AR/VR services/contents. In some embodiments, the HMD can determine the hand gestures performed by the hands of the user via performing inside-out tracking mechanisms, but the disclosure is not limited thereto.

In some embodiments, the HMD can include a (front) camera having a field of view (FOV), and when the hands of the user are in the FOV of the camera, the HMD can track the hands and accordingly determined the hand gestures based on the images captured by the camera, but the disclosure is not limited thereto. In the disclosure, details of the inside-out tracking mechanism can be referred to the related prior arts, and the details thereof would not be further described.

In FIG. 1, the host 100 includes a storage circuit 102 and a processor 104. The storage circuit 102 is one or a combination of a stationary or mobile random access memory (RAM), read-only memory (ROM), flash memory, hard disk, or any other similar device, and which records a plurality of modules and/or program codes that can be executed by the processor 104.

The processor 104 is coupled with the storage circuit 102, and the processor 104 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In the embodiments of the disclosure, the processor 104 can access the modules/program codes stored in the storage circuit 102 to implement the method for determining a posture of a user provided in the disclosure, which would be further discussed in the following.

Figure 2:
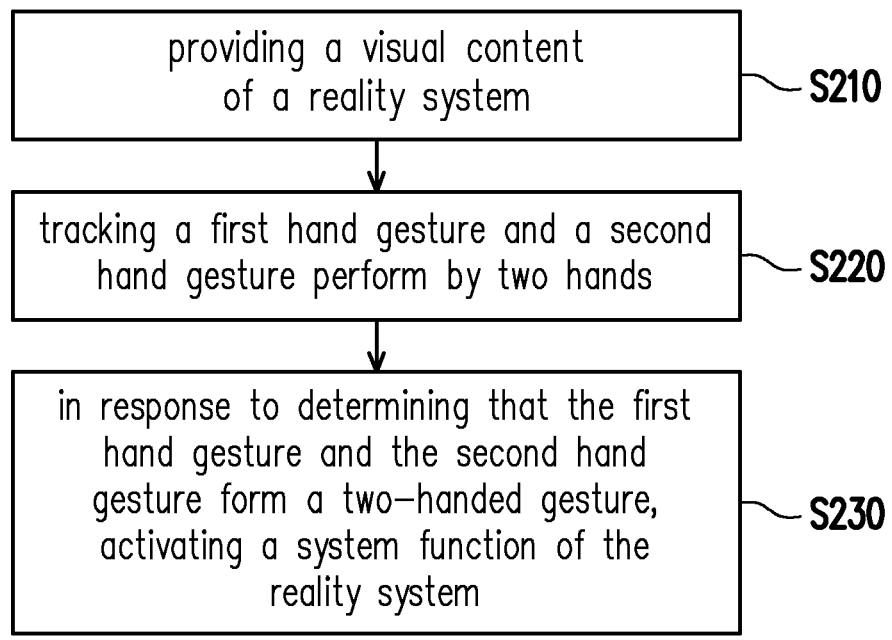
FIG. 2 shows a flow chart of the method for determining a two-handed gesture according to an embodiment of the disclosure.

See FIG. 2, which shows a flow chart of the method for determining a two-handed gesture according to an embodiment of the disclosure. The method of this embodiment may be executed by the host 100 in FIG. 1, and the details of each step in FIG. 2 will be described below with the components shown in FIG. 1.

In step S210, the processor 104 provides a visual content of a reality system. In various embodiments, the reality system can be an AR system, a VR system, a mixed reality (MR) system, and/or an extended reality (XR) system to which the host 100 belongs, but the disclosure is not limited thereto. In some embodiments, the visual content provided by the processor 104 can be the AR/VR/MR/XR contents shown by the HMD to the user of the HMD. In one embodiment, the visual content can include a virtual environment with 360 degree view. In one embodiment, the processor 104 can provide a part of the visual content for the user to see with the FOV of the user, and the content in the FOV of the user can be adjusted at least in response to the pose of the HMD.

In step S220, the processor 104 tracks a first hand gesture and a second hand gesture perform by two hands. In various embodiments, the two hands considered in step S220 can be any two hands existing in the FOV of the HMD. That is, the two hands considered in step S220 do not need to be the hands of the user/wearer of the HMD.

In the embodiments of the disclosure, the processor 104 can perform any existing hand gesture recognition algorithms to track the first hand gesture and the second hand gesture perform by the two hands in the FOV of the HMD. In one embodiment, after obtaining the first hand gesture and the second hand gesture, the processor 104 can further add a first hand object and a second hand object that respectively correspond to the two hands into the visual content.

In one embodiment, the processor 104 can further adjust the appearances of the first hand object and the second hand object in response to the first hand gesture and the second hand gesture. For example, if the processor 104 determines that the first hand gesture indicates that the corresponding hand is currently doing a fist, the processor 104 can adjust the appearance of the first hand object to be a fist, but the disclosure is not limited thereto.

In one embodiment, the processor 104 can further detect the pose/position of each finger on each of the first hand gesture and the second hand gesture during tracking the first hand gesture and the second hand gesture.

In one embodiment, the processor 104 can determine whether the first hand gesture and the second hand gesture (collectively) form a two-handed gesture.

In step S230, in response to determining that the first hand gesture and the second hand gesture form the two-handed gesture, the processor 104 activates a system function of the reality system, wherein the system function of the reality system is independent to the visual content. In some embodiments, the system function can be irrelevant to the visual content. For example, assuming that the visual content is a virtual environment of a specific application (e.g., a game application), the system function can be a function not used for interacting with the virtual environment of the specific application.

In some embodiments, the system function of the reality system can include at least one of taking a screenshot related to the visual content, activating a main menu page of the reality system, triggering a voice assistant of the reality system, and summoning an iconic virtual assistant. If the visual content is a virtual environment of a game application, none of these exemplary system functions can be regarded as being used to interact with the virtual environment of the game application. For example, the game scene/characters of the game application would not be adjusted in response to these exemplary system functions.

In the disclosure, there are several embodiments for determining whether the first hand gesture and the second hand gesture form the two-handed gesture, which would be discussed in the following.

In one embodiment, the screenshot related to the visual content includes at least one of a 360-degree screenshot of the visual content and a first screenshot of the FOV of the user in the visual content (i.e., the processor 104 takes the contents currently seen by the user as the first screenshot).

Figure 3A:
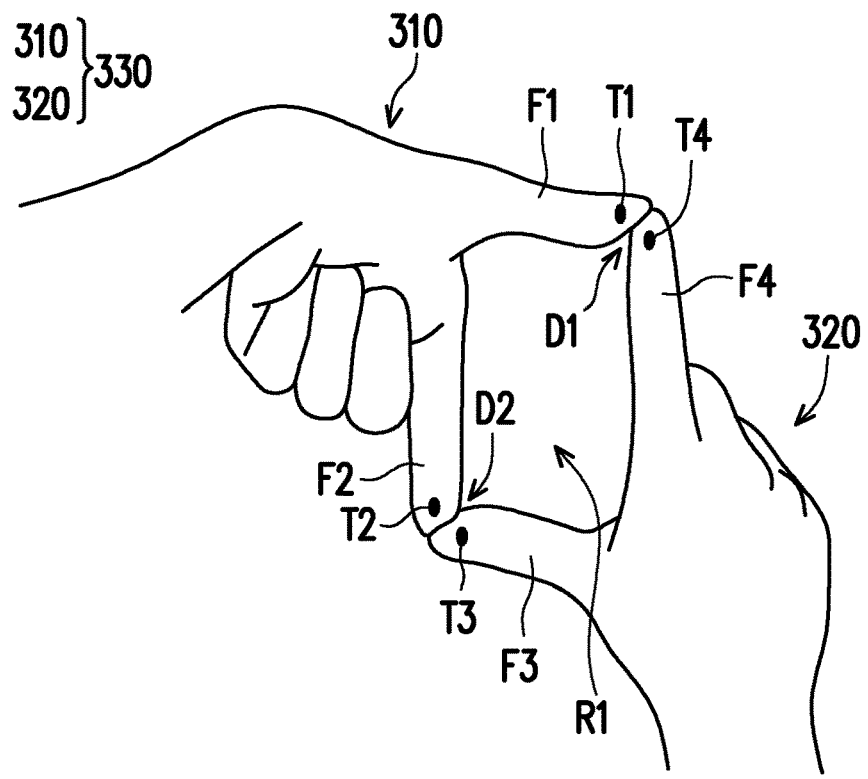
FIG. 3A and FIG. 3B show application scenarios according to the first embodiment of the disclosure.
Figure 3B:
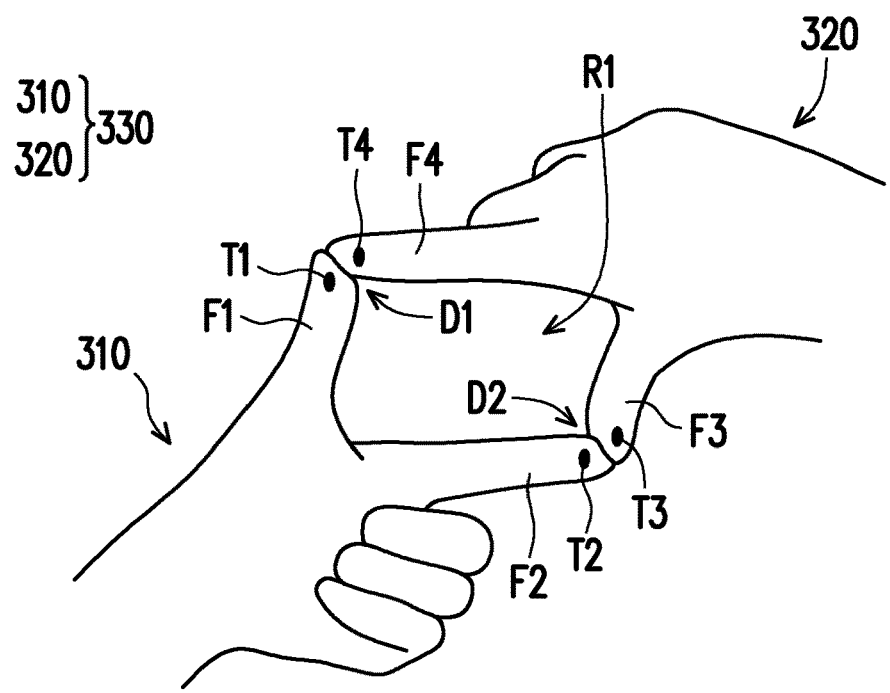

See FIG. 3A and FIG. 3B, which show application scenarios according to the first embodiment of the disclosure. In the first embodiment, the processor 104 obtains a first finger F1 and a second finger F2 in the first hand gesture 310 and obtains a third finger F3 and a fourth finger F4 in the second hand gesture 320. In the first embodiment, the first finger F1 and the second finger F2 can correspond to the thumb and index finger of the left hand of the user, and the third finger F3 and the fourth finger F4 can correspond to the thumb and index finger of the right hand of the user, but the disclosure is not limited thereto.

Next, the processor 104 determines whether the first finger F1, the second finger F2, the third finger F3 and the fourth finger F4 (collectively) form an enclosed region R1. In one embodiment, in response to determining that the first finger F1, the second finger F2, the third finger F3 and the fourth finger F4 form the enclosed region R1, the processor 104 determines that the first hand gesture 310 and the second hand gesture 320 form a two-handed gesture 330.

In one embodiment, the contents shown in FIG. 3A and FIG. 3B can be the visual contents seen by the user from the HMD. That is, the first hand gesture 310 and the second hand gesture 320 are presented by the aforementioned first hand object and the second hand object in the visual content. In this case, the screenshot related to the visual content taken in response to the two-handed gesture 330 can include a second screenshot of the enclosed region R1 formed by the two-handed gesture 330. That is, the processor 104 takes the contents within the enclosed region R1 as the second screenshot, but the disclosure is not limited thereto.

In FIG. 3A and FIG. 3B, the enclosed region R1 can be a substantially rectangular region. In other embodiments, the enclosed region R1 can be any desired polygonal region, e.g., triangular region, but the disclosure is not limited thereto.

In a first variant of the first embodiment, the processor 104 can obtain a first distance D1 between a tip T1 of the first finger F1 and a tip T4 of the fourth finger F4 and obtain a second distance D2 between a tip T2 of the second finger F2 and a tip T3 of the third finger F3. In one embodiment, in response to determining that the first distance D1 and the second distance D2 are lower than a distance threshold, the processor 104 determines that the first finger F1, the second finger F2, the third finger F3 and the fourth finger F4 form the enclosed region R1, wherein the enclosed region R1 is a region surrounded by the first finger F1, the second finger F2, the third finger F3 and the fourth finger F4. In one embodiment, the distance threshold can be any distance that can be any value characterizing that the tips of the fingers are close enough to each other. That is, when the processor 104 determines that the tips of the first finger F1 and the fourth finger F4 are close to each other and the tips of the second finger F2 and the third finger F3 are close to each other, the processor 104 can determine that the first finger F1, the second finger F2, the third finger F3 and the fourth finger F4 have formed the enclosed region R1, but the disclosure is not limited thereto.

Figure 3C:
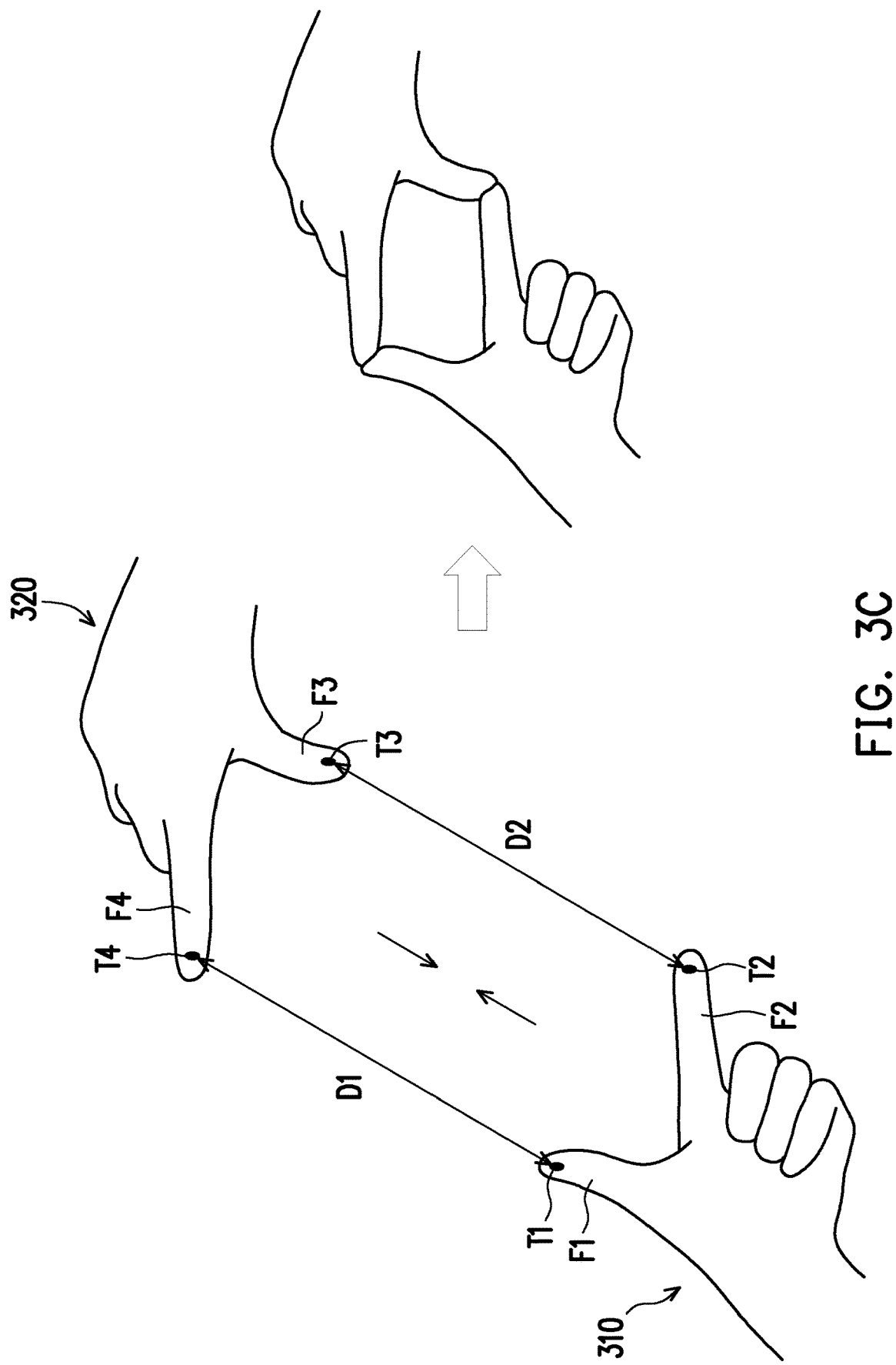
FIG. 3C shows an application scenario according to a second variant of the first embodiment.

See FIG. 3C, which shows an application scenario according to a second variant of the first embodiment. In the second variant of the first embodiment, after the processor 104 obtains the first distance D1 and the second distance D2, the processor 104 can determine whether the first distance D1 and the second distance D2 are gradually decreased to be lower than the distance threshold. In response to determining that the first distance D1 and the second distance D2 are gradually decreased to be lower than the distance threshold, the processor 104 determines that the first finger F1, the second finger F2, the third finger F3 and the fourth finger F4 form the enclosed region R1 and determines that the first hand gesture 310 and the second hand gesture 320 form the two-handed gesture 330.

In a third variant of the first embodiment, after the processor 104 determines that the first finger F1, the second finger F2, the third finger F3 and the fourth finger F4 (collectively) form the enclosed region R1, the processor 104 can further determine whether at least one of the first finger F1, the second finger F2, the third finger F3 and the fourth finger F4 performs a trigger movement. In some embodiments, if at least one of the first finger F1, the second finger F2, the third finger F3 and the fourth finger F4 (slightly) bends after forming the enclosed region R1, the processor 104 can determine that the trigger movement has been detected, but the disclosure is not limited thereto. In response to the trigger movement, the processor 104 can determine that the first hand gesture 310 and the second hand gesture 320 have (collectively) form the two-handed gesture 330.

In a fourth variant of the first embodiment, after the processor 104 determines that the first finger F1, the second finger F2, the third finger F3 and the fourth finger F4 (collectively) form the enclosed region R1, the processor 104 can further determine whether the enclosed region R1 has been maintained for a predetermined time length (e.g., 3 seconds or any desired time length). In some embodiments, in response to determining that the enclosed region R1 has been maintained for the predetermined time length, the processor 104 can determine that the first hand gesture 310 and the second hand gesture 320 have (collectively) form the two-handed gesture 330.

In one embodiment, the system function activated in response to the two-handed gesture 330 can include showing a see-through window in the visual content, wherein the see-through window shows a real-world scene captured by the (front) camera of the HMD of the reality system. In one embodiment, the real-world scene shown in the see-through window varies in response to a movement of the two-handed gesture. In particular, when the user maintains the two-handed gesture and moves the two-handed gesture around, the real-world scene in the see-through window would be accordingly changed. For example, when the user holds the two-handed gesture in front of the user, the user would see the real-world scene in front of the user via the see-through window. After the user maintains the two-handed gesture and moves the two-handed gesture to the left front, the user would see the real-world scene on the left front of the user via the see-through window, but the disclosure is not limited thereto.

In one embodiment, if the contents shown in FIG. 3A and FIG. 3B are the visual contents seen by the user from the HMD, the processor 104 can show the see-through window in the enclosed region R1. That is, the user can see the images corresponding to the real world scene via the see-through window, such that the user can see the things actually in front of the user via the see-through window.

Figure 4A:
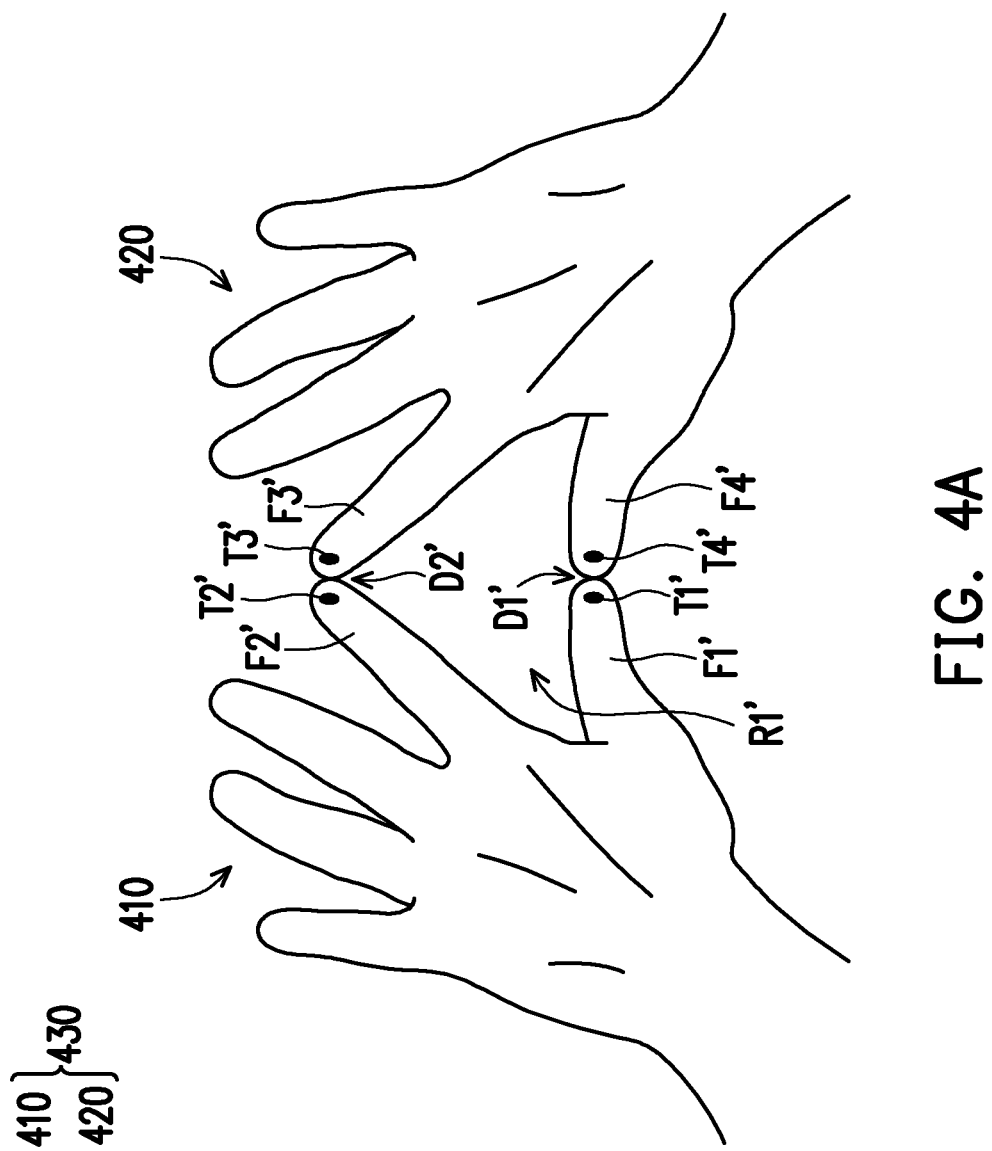
FIG. 4A and FIG. 4B show application scenarios according to the second embodiment of the disclosure.
Figure 4B:
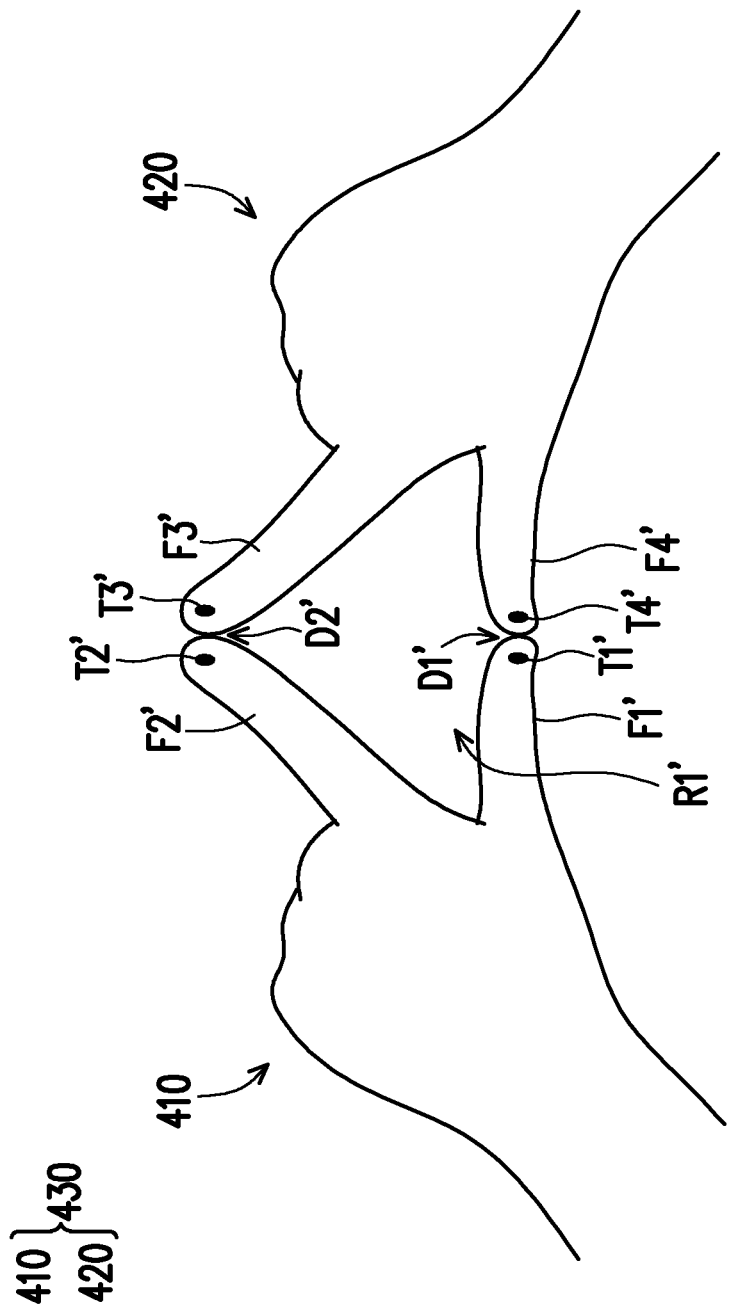

See FIG. 4A and FIG. 4B, which show application scenarios according to the second embodiment of the disclosure. In the second embodiment, the processor 104 obtains a first finger F1' and a second finger F2' in the first hand gesture 410 and obtains a third finger F3' and a fourth finger F4' in the second hand gesture 420. In the second embodiment, the first finger F1' and the second finger F2' can correspond to the thumb and index finger of the left hand of the user, and the third finger F3' and the fourth finger F4' can correspond to the index finger and thumb of the right hand of the user, but the disclosure is not limited thereto.

Next, the processor 104 determines whether the first finger F1', the second finger F2', the third finger F3' and the fourth finger F4' (collectively) form an enclosed region R1'. In one embodiment, in response to determining that the first finger F1', the second finger F2', the third finger F3' and the fourth finger F4' form the enclosed region R1', the processor 104 determines that the first hand gesture 410 and the second hand gesture 420 form a two-handed gesture 430.

In one embodiment, the contents shown in FIG. 4A and FIG. 4B can be the visual contents seen by the user from the HMD. That is, the first hand gesture 410 and the second hand gesture 420 are presented by the aforementioned first hand object and the second hand object in the visual content. In this case, the screenshot related to the visual content taken in response to the two-handed gesture 430 can include a second screenshot of the enclosed region R1' formed by the two-handed gesture 430. That is, the processor 104 takes the contents within the enclosed region R1' as the second screenshot, but the disclosure is not limited thereto.

In FIG. 4A and FIG. 4B, the enclosed region R1' can be a substantially triangular region. In other embodiments, the enclosed region R1' can be any desired shaped region, such as a circular region and/or a polygonal region, but the disclosure is not limited thereto.

In a first variant of the second embodiment, the processor 104 can obtain a first distance D1' between a tip T1' of the first finger F1' and a tip T4' of the fourth finger F4' and obtain a second distance D2' between a tip T2' of the second finger F2' and a tip T3' of the third finger F3'. In one embodiment, in response to determining that the first distance D1' and the second distance D2' are lower than the distance threshold, the processor 104 determines that the first finger F1', the second finger F2', the third finger F3' and the fourth finger F4' form the enclosed region R1', wherein the enclosed region R1' is a region surrounded by the first finger F1', the second finger F2', the third finger F3' and the fourth finger F4'. In one embodiment, the distance threshold can be any distance that can be any value characterizing that the tips of the fingers are close enough to each other. That is, when the processor 104 determines that the tips of the first finger F1' and the fourth finger F4' are close to each other and the tips of the second finger F2' and the third finger F3' are close to each other, the processor 104 can determine that the first finger F1', the second finger F2', the third finger F3' and the fourth finger F4' have formed the enclosed region R1', but the disclosure is not limited thereto.

Figure 4C:
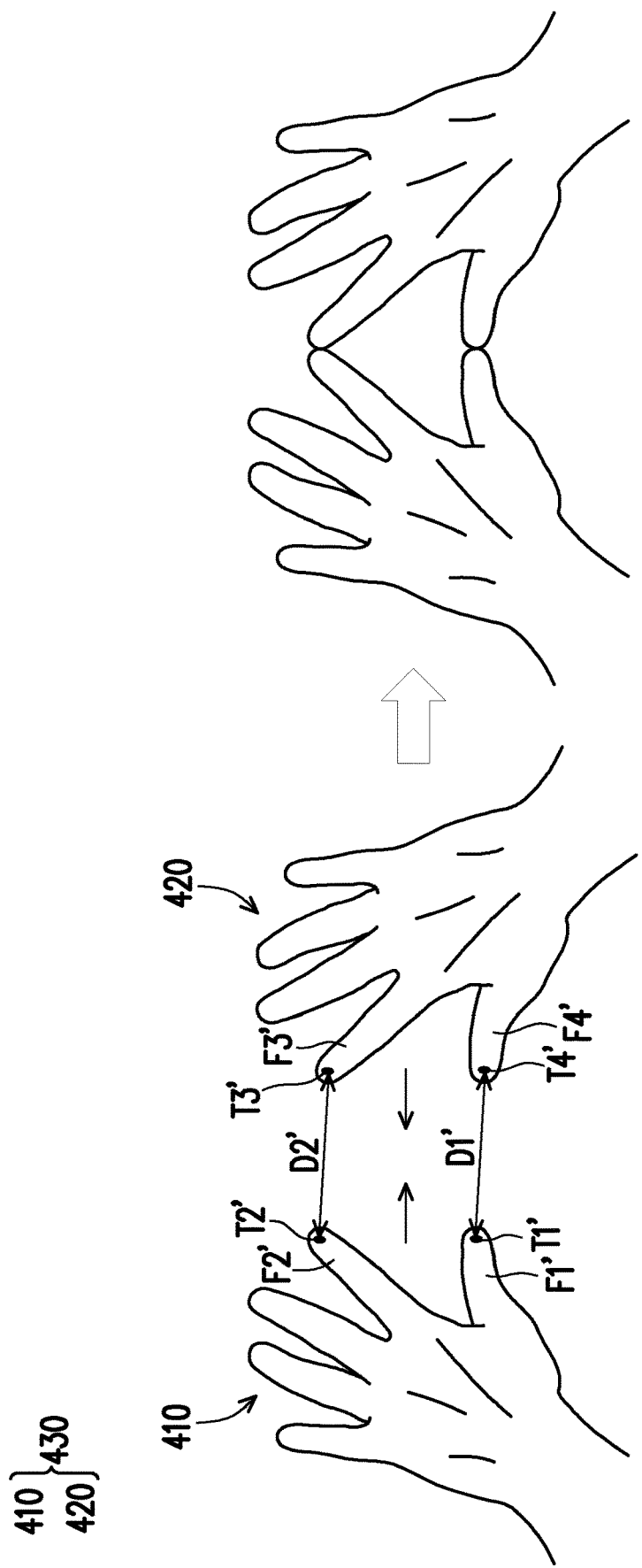
FIG. 4C shows an application scenario according to a second variant of the second embodiment.

See FIG. 4C, which shows an application scenario according to a second variant of the second embodiment. In the second variant of the second embodiment, after the processor 104 obtains the first distance D1' and the second distance D2', the processor 104 can determine whether the first distance D1' and the second distance D2' are gradually decreased to be lower than the distance threshold. In response to determining that the first distance D1' and the second distance D2' are gradually decreased to be lower than the distance threshold, the processor 104 determines that the first finger F1', the second finger F2', the third finger F3' and the fourth finger F4' form the enclosed region R1' and determines that the first hand gesture 410 and the second hand gesture 420 form the two-handed gesture 430.

In a third variant of the second embodiment, after the processor 104 determines that the first finger F1', the second finger F2', the third finger F3' and the fourth finger F4' (collectively) form the enclosed region R1', the processor 104 can further determine whether at least one of the first finger F1', the second finger F2', the third finger F3' and the fourth finger F4' performs a trigger movement. In some embodiments, if at least one of the first finger F1', the second finger F2', the third finger F3' and the fourth finger F4' (slightly) bends after forming the enclosed region R1', the processor 104 can determine that the trigger movement has been detected, but the disclosure is not limited thereto. In response to the trigger movement, the processor 104 can determine that the first hand gesture 410 and the second hand gesture 420 have (collectively) form the two-handed gesture 430.

In a fourth variant of the second embodiment, after the processor 104 determines that the first finger F1', the second finger F2', the third finger F3' and the fourth finger F4' (collectively) form the enclosed region R1', the processor 104 can further determine whether the enclosed region R1' has been maintained for a predetermined time length (e.g., 3 seconds or any desired time length). In some embodiments, in response to determining that the enclosed region R1' has been maintained for the predetermined time length, the processor 104 can determine that the first hand gesture 410 and the second hand gesture 420 have (collectively) form the two-handed gesture 430.

Figure 5:
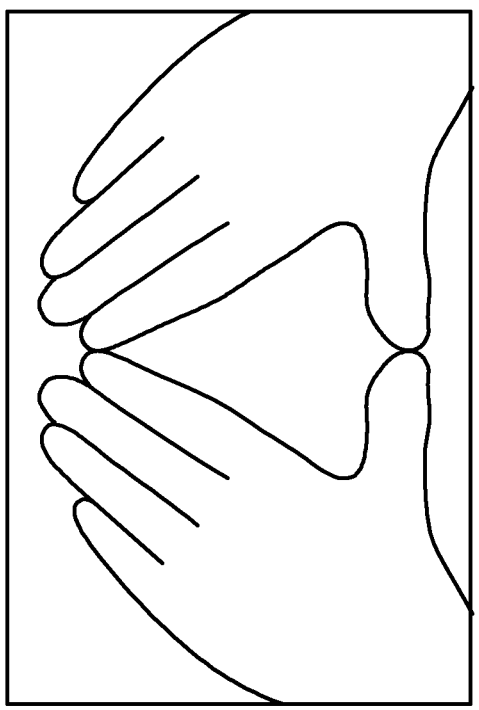
FIG. 5 shows a schematic diagram of showing a see-through window in the visual content according to an embodiment of the disclosure.
Figure 5:
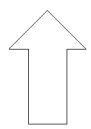
Figure 5:
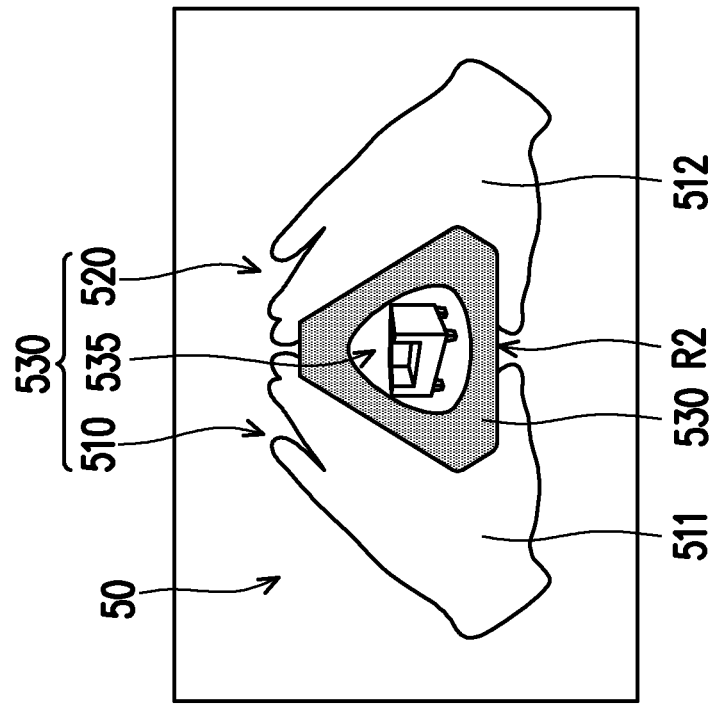

See FIG. 5, which shows a schematic diagram of showing a see-through window in the visual content according to an embodiment of the disclosure. In FIG. 5, it is assumed that the processor 104 detects a first hand gesture 510 and a second hand gesture 520 that (collectively) form a two-handed gesture 530 in a visual content 50. In this case, the first hand gesture 510 and the second hand gesture 520 are presented by a first hand object 511 and a second hand object 512 in the visual content 50.

In response to the two-handed gesture 530, the processor 104 can accordingly activate a system function of the reality system. In FIG. 5, the system function activated in response to the two-handed gesture 530 can include showing a see-through window 535 in the visual content 50 provided by the HMD, wherein the see-through window 535 shows a real-world scene captured by the (front) camera of the HMD of the reality system. In FIG. 5, the see-through window 535 can show a chair that actually in front of the user, but the disclosure is not limited thereto. In FIG. 5, the processor 104 can further show a virtual object 530 in the visual content 50, wherein the virtual object 530 has a shape corresponding to a shape of an enclosed region R2 within the two-handed gesture 530, and the see-through window 535 locates within the virtual object 530. In some embodiments the appearance of the virtual object 530 can be designed to correspond to a brand logo of the manufacturer of the reality system, such that the user would feel more connected with the manufacturer, but the disclosure is not limited thereto.

In some embodiments, after activating the system function, the processor 104 can determine whether the two-handed gesture disappears. For example, the processor 104 may determine whether the first hand gesture and the second gesture still collectively form the enclosed region. If not, it may represent that the user would like to deactivate the system function previously activated (e.g., the see-through window). Therefore, in response to determining that the two-handed gesture disappears, the processor 104 can deactivate the system function of the reality system, such as removing the see-through window from the visual content, but the disclosure is not limited thereto.

The disclosure further provides a computer readable medium for executing the method for determining a posture of a user. The computer readable medium is composed of a plurality of program instructions (for example, a setting program instruction and a deployment program instruction) embodied therein. These program instructions can be loaded into the host 100 and executed by the same to execute the method for determining a posture of a user and the functions of the host 100 described above.

In summary, the embodiments of the disclosure can activate a system function of the reality system in response to determining that the first hand gesture and the second hand gesture have (collectively) formed a two-handed gesture. In this case, the user can interact with the reality system in a novel way, instead of being limited to interacting with the reality system only with one-handed gesture.

It will be apparent to those skilled in the art that various modifications and variations can be made to the structure of the present invention without departing from the scope or spirit of the disclosure. In view of the foregoing, it is intended that the present disclosure cover modifications and variations of this invention provided they fall within the scope of the following claims and their equivalents.

What is claimed is:

1. A method for determining a two-handed gesture, adapted to a host, wherein the host is a virtual reality head-mounted display (VR HMD), comprising:
   providing a visual virtual reality content;
   tracking a first hand gesture and a second hand gesture perform by two hands;
   in response to determining that the first hand gesture and the second hand gesture form a two-handed gesture, activating a system function of the reality system, wherein the system function of the reality system comprises showing a see-through window in a field of view (FOV) of a user of the host, wherein the see-through window shows a real-world scene captured by a front camera of the HMD of the reality system and the see-through window is surrounded by the virtual reality content.

2. The method according to claim 1, wherein the system function of the reality system further comprises at least one of taking a screenshot related to the visual content, activating a main menu page of the reality system, triggering a voice assistant of the reality system, and summoning an iconic virtual assistant.

3. The method according to claim 1, wherein the real-world scene shown in the see-through window varies in response to a movement of the two-handed gesture.

4. The method according to claim 2, wherein the screenshot related to the visual content comprises at least one of a 360-degree screenshot of the visual content, a first screenshot of a field of view in the visual content, and a second screenshot of an enclosed region formed by the two-handed gesture.

5. The method according to claim 1, comprising:
obtaining a first finger and a second finger in the first hand gesture and obtaining a third finger and a fourth finger in the second hand gesture;
in response to determining that the first finger, the second finger, the third finger and the fourth finger form an enclosed region, determining that the first hand gesture and the second hand gesture form the two-handed gesture.

6. The method according to claim 5, further comprising:
obtaining a first distance between a tip of the first finger and a tip of the fourth finger;
obtaining a second distance between a tip of the second finger and a tip of the third finger;
in response to determining that the first distance and the second distance are lower than a distance threshold, determining that the first finger, the second finger, the third finger and the fourth finger form the enclosed region, wherein the enclosed region is a region surrounded by the first finger, the second finger, the third finger and the fourth finger.

7. The method according to claim 5, further comprising:
obtaining a first distance between a tip of the first finger and a tip of the fourth finger;
obtaining a second distance between a tip of the second finger and a tip of the third finger;
in response to determining that the first distance and the second distance are gradually decreased to be lower than a distance threshold, determining that the first finger, the second finger, the third finger and the fourth finger form the enclosed region and determining that the first hand gesture and the second hand gesture form the two-handed gesture, wherein the enclosed region is a region surrounded by the first finger, the second finger, the third finger and the fourth finger.

8. The method according to claim 5, wherein before the step of determining that the first hand gesture and the second hand gesture form the two-handed gesture, the method further comprises:
in response to determining that at least one of the first finger, the second finger, the third finger and the fourth finger performs a trigger movement, determining that the first hand gesture and the second hand gesture form the two-handed gesture.

9. The method according to claim 5, wherein before the step of determining that the first hand gesture and the second hand gesture form the two-handed gesture, the method further comprises:
in response to determining that the enclosed region has been maintained for a predetermined time length, determining that the first hand gesture and the second hand gesture form the two-handed gesture.

10. The method according to claim 5, wherein the enclosed region comprises a circular region or a polygonal region.

11. The method according to claim 1, wherein the two-handed gesture forms an enclosed region, and the method further comprises:
showing a virtual object in the visual content, wherein the virtual object has a shape corresponding to a shape of the enclosed region, and the see-through window locates within the virtual object.

12. The method according to claim 1, wherein after the step of activating the system function of the reality system, the method further comprises:
in response to determining that the two-handed gesture disappears, deactivating the system function of the reality system.

13. A host, wherein the host is a virtual reality head-mounted display (VR HMD), comprising:
a non-transitory storage circuit, storing a program code;
a processor, coupled to the storage circuit and accessing the program code to perform:
providing a virtual reality content;
tracking a first hand gesture and a second hand gesture perform by two hands;
in response to determining that the first hand gesture and the second hand gesture form a two-handed gesture, activating a system function of the reality system, wherein the system function of the reality system comprises showing a see-through window in a filed of view (FOV) of a user of the host, wherein the see-through window shows a real-world scene captured by a front camera of the HMD of the reality system and the see-through window is surrounded by the virtual reality content.

14. The host according to claim 13, wherein the system function of the reality system further comprises at least one of taking a screenshot related to the visual content, activating a main menu page of the reality system, triggering a voice assistant of the reality system, and summoning an iconic virtual assistant.

15. The host according to claim 13, comprising:
obtaining a first finger and a second finger in the first hand gesture and obtaining a third finger and a fourth finger in the second hand gesture;
in response to determining that the first finger, the second finger, the third finger and the fourth finger form an enclosed region, determining that the first hand gesture and the second hand gesture form the two-handed gesture.

16. The host according to claim 15, further comprising:
obtaining a first distance between a tip of the first finger and a tip of the fourth finger;
obtaining a second distance between a tip of the second finger and a tip of the third finger;
in response to determining that the first distance and the second distance are lower than a distance threshold, determining that the first finger, the second finger, the third finger and the fourth finger form the enclosed region, wherein the enclosed region is a region surrounded by the first finger, the second finger, the third finger and the fourth finger.

17. The host according to claim 15, further comprising:
obtaining a first distance between a tip of the first finger and a tip of the fourth finger;
obtaining a second distance between a tip of the second finger and a tip of the third finger;
in response to determining that the first distance and the second distance are gradually decreased to be lower than a distance threshold, determining that the first finger, the second finger, the third finger and the fourth finger form the enclosed region and determining that the first hand gesture and the second hand gesture form the two-handed gesture, wherein the enclosed region is a region surrounded by the first finger, the second finger, the third finger and the fourth finger.

18. The host according to claim 15, wherein before the step of determining that the first hand gesture and the second hand gesture form the two-handed gesture, the method further comprises:

in response to determining that at least one of the first finger, the second finger, the third finger and the fourth finger performs a trigger movement, determining that the first hand gesture and the second hand gesture form the two-handed gesture.

19. A non-transitory computer readable medium, the computer readable medium recording an executable computer program, the executable computer program being loaded by a host to perform steps of:

providing a virtual reality content, wherein the host is a virtual reality head-mounted display (VR HMD);

tracking a first hand gesture and a second hand gesture perform by two hands;

in response to determining that the first hand gesture and the second hand gesture form a two-handed gesture, activating a system function of the reality system, wherein the system function of the reality system comprises showing a see-through window in a filed of view (FOV) of a user of the host, wherein the see-through window shows a real-world scene captured by a front camera of the HMD of the reality system and the see-through window is surrounded by the virtual reality content.

* * * * *